(12) United States Patent
Deysarkar et al.

(10) Patent No.: US 10,836,849 B1
(45) Date of Patent: Nov. 17, 2020

(54) SYSTEMS AND METHODS OF POLYMERIZATION UNDER EXTENSIONAL FLOW CONDITIONS

(71) Applicant: PfP Industries, LLC, Houston, TX (US)

(72) Inventors: Asoke Kumar Deysarkar, Houston, TX (US); Michael Joseph Callanan, IV, Houston, TX (US); Robert Ray McDaniel, Cypress, TX (US); Brian James Keola DeCaires, Cypress, TX (US)

(73) Assignee: PfP Industries, LLC, Houston, TX (US)

( * ) Notice: Subject to any disclaimer, the term of this patent is extended or adjusted under 35 U.S.C. 154(b) by 0 days.

(21) Appl. No.: 16/900,084

(22) Filed: Jun. 12, 2020

Related U.S. Application Data (63) Continuation-in-part of application No. 16/556,566, filed on Aug. 30, 2019, now Pat. No. 10,703,963.

(51) Int. Cl.
  *C08F 20/56* (2006.01)
  *C09K 8/24* (2006.01)
  *C09K 8/60* (2006.01)

(52) U.S. Cl.
  CPC ............. *C08F 20/56* (2013.01); *C09K 8/24* (2013.01); *C09K 8/608* (2013.01)

(58) Field of Classification Search
  None
  See application file for complete search history.

(56) References Cited

U.S. PATENT DOCUMENTS

| | | | | |
|---|---|---|---|---|
| 4,489,180 A * | 12/1984 | Lundberg | ............ | C09K 8/588 523/175 |
| 5,465,792 A * | 11/1995 | Dawson | ............ | C09K 8/512 166/294 |
| 6,169,058 B1 * | 1/2001 | Le | ............ | C09K 8/62 166/308.4 |
| 2008/0210423 A1 * | 9/2008 | Boney | ............ | C09K 8/68 166/281 |
| 2014/0051620 A1 * | 2/2014 | Soane | ............ | C09K 8/36 508/471 |
| 2014/0364346 A1 * | 12/2014 | Weinstein | ............ | C09K 8/90 507/225 |
| 2017/0158948 A1 * | 6/2017 | Kim | ............ | C09K 8/588 |

* cited by examiner

*Primary Examiner* — John J Figueroa
(74) *Attorney, Agent, or Firm* — Vorys, Sater, Seymour and Pease LLP (57) ABSTRACT

A method includes combining an aqueous fluid and an oleaginous fluid to prepare an invert emulsion comprising a polymerizable composition, degassing the invert emulsion under an extensional flow regime through an elongated passageway of an extender and thereby removing oxygen to produce a degassed invert emulsion. A flow rate of the invert emulsion and a diameter of the elongated passageway are sufficient to achieve a Reynolds number of 20,000 or greater. The method also includes transferring at least a portion of the degassed invert emulsion to the second extender at one or more time intervals and returning the portion of the degassed invert emulsion to the reactor, and isolating a polymer product from the degassed invert emulsion. A flow rate of the invert emulsion and a diameter of the elongated passageway are sufficient to achieve a Reynolds number of 20,000 or greater.

20 Claims, 3 Drawing Sheets

SYSTEMS AND METHODS OF POLYMERIZATION UNDER EXTENSIONAL FLOW CONDITIONS

BACKGROUND

Polymers are important macromolecules used in everyday life. The structural characteristics that determine the functionality of a polymer can be divided into four classes. Beginning at the molecular level, a polymer's primary structure includes a backbone chain that can be linear or branched, and comprised of monomers in random, alternating, block, or graft structures. Secondary structural effects relate to intramolecular interactions based on ionic interactions, polar interactions, hydrogen bonding, and steric effects. Tertiary structural effects are from the intermolecular interaction with other polymer chains. Quaternary structural effects are determined by intermolecular interaction by multiple polymer chains.

Polymers are assembled from monomers during a polymerization reaction that includes that basic steps of initiation, propagation (polymer formation), and termination. Mechanisms of polymerization can be sorted into two categories: step-growth polymerization (polyaddition) and chain-growth polymerization. Step-growth polymerization is a polymerization reaction in which polymer is formed by independent reactions, i.e., multifunctional monomers combining to form dimers and oligomers that eventually coalesce to form polymer chains. In many cases, no initiator is required for step-growth polymerization, polymerization begins when reactive monomers are present at the proper concentration and conditions. Termination of step-growth reactions occurs with the exhaustion of monomer concentration or the addition of a terminating agent, such as a monofunctional monomer that prevents subsequent chain extension. Examples of polymers generated by step-growth polymerization include polyester, polyamide, and polyether.

Chain-growth polymerization is the addition of one monomer at a time to the polymer chain. Polymerization begins with the addition of an initiator species, such as a radical, ion, or coordination catalyst that promotes the addition of monomers to a growing polymer chain. Unlike step-growth polymerization, chain-growth polymerization can involve chain transfer reactions during propagation in which the anion, radical, or coordination catalyst center transfer from a polymer chain end to another molecule or elsewhere on the polymer chain. For chain-growth polymerization, termination requires a terminator to quench the reactive species like the addition of a radical or radical scavenger, neutralization, or catalyst removal. Examples of chain-growth polymers include polyethylene, polyvinylchloride, polyacrylic acid, and polyacrylamide.

Synthesis of high molecular weight polymers can be difficult for many polymer types because step-growth and chain extension reactions begin to slow in frequency due to structural effects. Under standard polymerization conditions, polymer chains begin to fold and entangle, which reduces the availability of chain ends for addition by monomers and other reactive species. The reduction in chain extension is also accompanied by an increase in the concentration of lower molecular weight species and branching side reactions.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure relates to process methods and systems in which one or more process stages incorporate an extender to enhance mixing action and place components in an extensional flow regime. In another aspect, systems and methods disclosed herein are applicable to polymerization processes, including emulsion polymerization, to generate polymers having defined molecular weight distributions and controllable branching. In yet another aspect, methods disclosed herein relate to methods of forming and degassing an emulsion in a single step.

Methods disclosed herein include the preparation of polymer compositions and the use of extenders to modify process conditions at one or more stages of polymerization. Extenders can be used to enhance rates of mixing, gas exchange, and polymerization, which can lead to better reaction initiation and completion. Polymerization under extensional flow conditions in an extender can also contribute to a number of structural changes, including increased overall weight average molecular weight and modifying the degree of polymer branching. During propagation, chain transfer side reactions can occur including intermolecular reactions between a polymer chain and other reactive species in solution such as monomers, initiators, solvent, and other polymer chains. As the polymer chain grows in length and begins folding upon itself, intramolecular chain transfer can also occur. Mitigation of chain transfer often involves kinetic control by reducing temperature and reaction rates. In addition to kinetic controls, methods disclosed herein can incorporate an extender during polymerization that reduces intramolecular chain transfer reactions by stretching polymer chains into a linear configuration that prevents backbiting chain transfer reactions, while also exposing reactive end sites for chain extension.

Polymerization processes disclosed herein can be adapted to a number of systems including aqueous polymerization, inverse emulsion (water in oil, or w/o) polymerization, inverse microemulsion polymerization, and precipitation polymerization. Emulsion polymerization techniques include a number of advantages, such as high solids concentrations, lower solution viscosities, increased heat removal, and easier mixing. The better the thermodynamic stability of the emulsion, the less separation of phases over time. Emulsion stability is dependent on a number of factors that include the presence of emulsifiers and the nature of the monomer(s) and other additives. As emulsification improves through mixing and/or the use of emulsifiers to enhance emulsion stability, microemulsions can form in which the internal phase has a low particle size, in the range of 50 Å to 100 Å. Reduced internal phase particle size is also associated with increased rates of polymerization, which can be increased by 10-200 times in some systems. Industrially, emulsions are prepared by mixing the oil and aqueous phases through high shear pumps or mixing systems, which are costly in terms of equipment, energy, and time expenditures.

Degassing to remove oxygen is another important consideration for polymerization processes. Oxygen is a known inhibitor of many polymerization initiators, and reactant mixtures are often degassed in the presence of an inert gas (or mixture) to remove or reduce the concentration of oxygen prior to initiation. In some processes, oxygen levels can be reduced to 1 part per million (ppm) or less. Several parameters affect the rate of degassing including oxygen solubility, liquid temperature, and inert gas injection methodology. Of these factors, solubility is dependent on the reactant liquids used, and temperature is often constrained by the initiator temperature. At scale, degassing is often employed following emulsification, which can increase costs and time, and limit overall production when done separately.

Methods in accordance with the present disclosure can incorporate an extender at one or more stages. Broadly, extenders disclosed herein promote mixing between different phases (including gas/liquid phases and liquid/liquid phases) by placing components into extensional flow. Without being limited by theory, it is believed there are three flow regimes/mechanisms by which compositions can mix. The first is laminar flow where the only mixing that takes places is between two adjacent layers by diffusion. This diffusion is a slow process and controlled by diffusional coefficient. The second is turbulent flow where two mechanisms are present: diffusion and convective (convection) mixing. Convective mixing is the primary mechanism by which mixing and dissolution takes place. In a turbulent regime flow, not only convective mixing takes place, but also diffusion mixing between the layers but with an order of magnitude difference between the two. The third is extensional flow, which has three mechanisms of mixing: diffusion, convective mixing (very little), and polymer stretching. Because of the high flow rate and small diameter flow path needed to achieve extensional flow, the polymer chains are stretched, which can influence polymerization rates and chain extension characteristics.

Extenders disclosed herein can provide a number of advantages, including enhanced oxygen removal rates during degassing, simultaneous degassing and emulsion preparation, increased component mixture during polymerization, and increased reaction efficiency under extensional flow conditions by increasing polymer stretching and reaction site accessibility. In embodiments directed to emulsion polymerization methods, one or more extenders can be used for simultaneous emulsion preparation and degassing in a single step, followed by polymerization in which a polymerizing mixture is processed through one or more extenders under extensional flow.

Extenders disclosed herein can include a design incorporating an elongated passageway in which fluids and/or gases are pumped at high flow rates to achieve an extensional flow regime for various processes including degassing and emulsion polymerization. As used herein, the term "extensional flow regime" refers to a flow regime characterized by high momentum diffusion, low momentum convection, and polymer stretching. The extensional flow regime is achieved by the synergistic combination of (a) a high flow rate through the elongated passageway of the extender and (b) a size and shape of the elongated passageway to achieve a Reynolds number (e.g., 20,000 or greater) through the passageway with little to no turbulence or eddies. Such flow rates with viscous fluids are often associated with turbulent flow and the production of eddies. In contrast, the inlet, elongated passageway, and outlet of the extender are designed to achieve little to no turbulence or eddies at high flow rates.

In the context of polymer systems, turbulent flow regimes can impart significant force on polymer chains, which can increase the occurrence of chain scission reactions along the polymer backbone. Chain scission reactions convert longer polymer chains to shorter species, which can change the overall molecular weight and structure of a polymer composition. In some cases, turbulent conditions (such as those resulting from the use of high shear mixers, for example) shift the weight average molecular weight lower and broaden the molecular weight distribution as a fraction of the large chains are sheared and converted to smaller polymers. In contrast, extensional flow regimes carry the benefits of enhanced mixing, while preserving chain length and overall polymer characteristics.

In some embodiments, the elongated passageway of the extender may be designed without, or otherwise not including, any moving parts that might inadvertently cause shear. Without being bound by theory or mechanism, it is believed that, when incorporated into a polymerization process, processing polymerizing compositions under extensional flow increases the elongation and unfolding of forming polymer chains, which can modify polymerization rates and properties such as molecular weight and branching index. The extender design then changes to maintain extensional flow but at a lower flow rate than in elongated passageway so that the fluid exiting the extender can be further processed without inducing high shear degradation of polymerized species in the obtained product mixture.

One or more of the presently disclosed methods can include flowing compositions for degassing, emulsification, and/or polymerization in an extensional flow regime where the flow rate and dimensions of the elongated passageway are chosen to achieve a Reynolds number for the composition passing through the elongated passageway of 20,000 or greater (e.g., 50,000, 75,000, 100,000 to 800,000, or 250,000 to 750,000, or 400,000 to 600,000). The flow rate and dimensions of the elongated passageway can be any suitable values to achieve said Reynolds number.

By way of nonlimiting example, the volumetric flow rate through the elongated passageway may be at least 50 gallons per minute (gpm) (0.19 m$^3$/min) (e.g., 50 gpm to 200 gpm (0.76 m$^3$/min), or 75 gpm (0.28 m$^3$/min) to 175 gpm (0.66 m$^3$/min), or 100 gpm (0.38 m$^3$/min) to 150 gpm (0.57 m$^3$/min)). By way of another nonlimiting example, the diameter of the elongated passageway at its narrowest may be 45 mm or less (e.g., 10 mm to 45 mm, or 10 mm to 30 mm, or 15 mm to 20 mm). By way of yet another nonlimiting example, with a volumetric flow rate of 115 gpm through the elongated passageway, and a diameter of the elongated passageway at its narrowest of 19 mm yields a Reynolds number of about 500,000. While a number of extender design parameters are presented, it is also envisioned that design parameters, such as flow rate and internal extender dimensions, can be adjusted depending on handling capacity, reagent properties and rheology, product volume, system design, and other operational requirements.

Polymerization processes can incorporate one or more extenders at various process stages. Methods presented in the following examples are discussed in terms of invert emulsions and microemulsions, however, it is envisioned that the methods can also be applied to direct emulsions and non-emulsion polymerization methods. In the example shown in FIG. 1, a polymer is prepared using an example inverse emulsion polymerization system 100. As illustrated, oleaginous fluid 102 contains a polymerizable mixture that can include one or more of monomers, comonomers, initiators, emulsifiers, and polymerization additives. The oleaginous fluid 102 is combined with an aqueous fluid 104 in a mixing device 106a that mixes (blends) the oleaginous fluid 102 and the aqueous fluid 104 to form an emulsion, such as an invert emulsion. The oleaginous fluid 102 and aqueous fluid 104 can also be combined prior to injection and mixing in the mixing device 106a in some embodiments.

Figure 1:
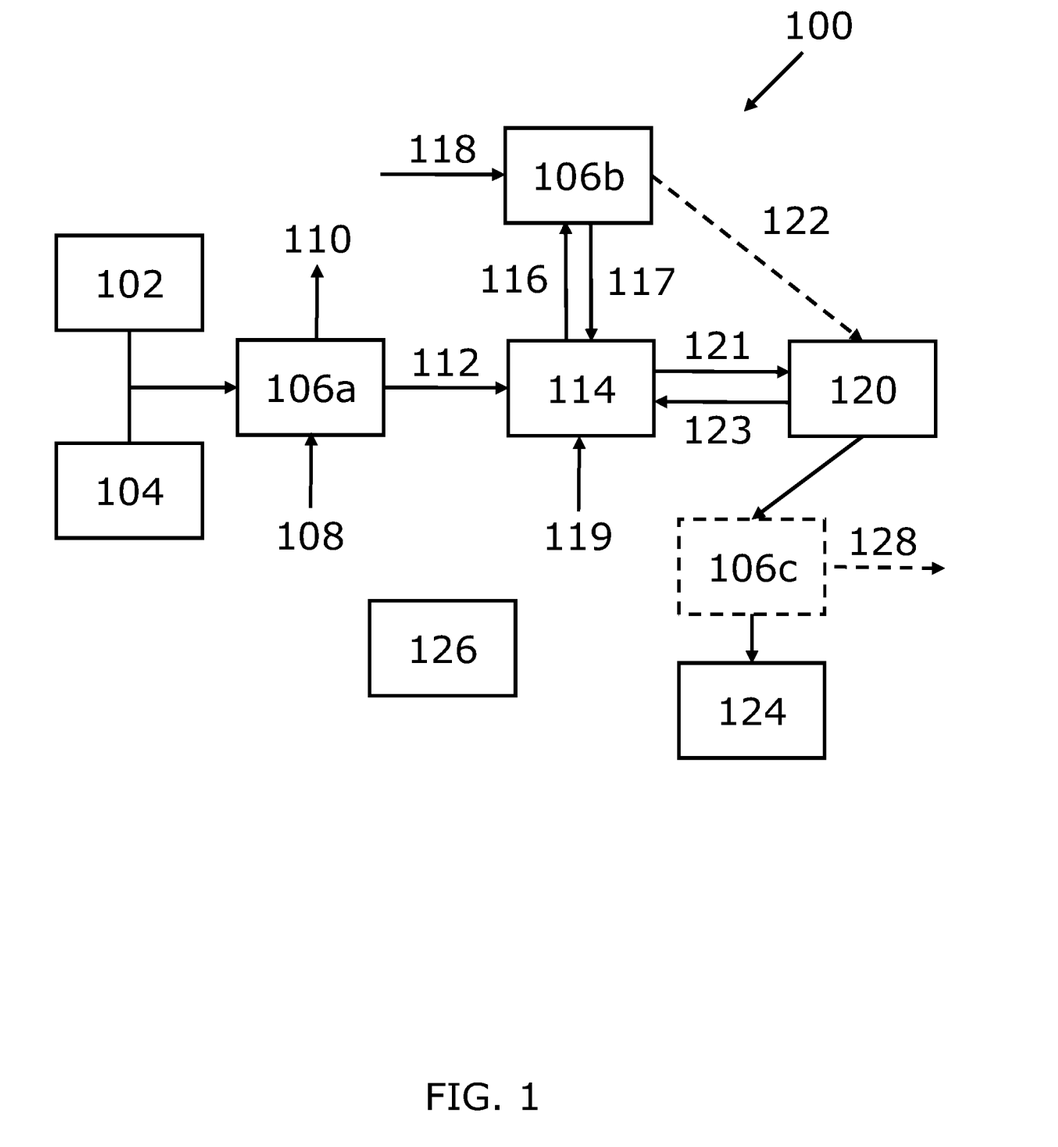
FIG. 1 is a schematic diagram of an example polymerization system that may incorporate one or more principles of the present disclosure.

The mixing device 106a of polymerization system 100 is also configured to remove oxygen and other gasses simultaneously while preparing the invert emulsion. Mixing device 106a can be configured to inject gasses and/or liquids as stream 108 into a cross stream by induction. In this example, an inert gas (or gas mixture), such as nitrogen, is injected as stream 108 into the mixing device 106a to displace oxygen from the invert emulsion formed from the oleaginous fluid 102 and the aqueous fluid 104, while oxygen and vent gases are released as stream 110. In some embodiments, mixing device 106a can be combined with a vacuum that enhances oxygen removal.

A degassed emulsion is then discharged from the mixing device 106a and transferred as stream 112 to polymerization reactor 114 where polymerization is initiated. Polymerization processes in accordance with the present disclosure can include continuous and batch processes, and polymerization reactor 114 can be selected according to the selected process method. During the polymerization reaction, the reactor 114 can be supplemented by stream 119 with one or more reactants or additives, including monomers, emulsifiers, initiators, terminating agents, and the like.

Residence time in the reactor 114 can vary depending on a number of factors such as the target molecular weight of the polymer product 124. In at least one embodiment, the polymerizing mixture originating from stream 112 may reside within the reactor 114 between 1 and 5 minutes, but could reside within the reactor 114 for a time period that is shorter or longer than 1 to 5 minutes in some embodiments, without departing from the scope of the disclosure. During operation, the fluid level within the reactor 114 may be adjusted to increase or decrease the residence time.

At one or more intervals, at least a portion of the polymerizing mixture is transferred as a stream 116 to a second mixing device 106b, which places the stream 116 in an extensional flow regime during polymerization. After passage through mixing device 106b, the stream 117 can be transferred back to the polymerization reactor 114. In some embodiments, the polymerizing mixture can be cycled by the streams 116 and 117 between the reactor 114 and the mixing device 106b for multiple cycles without shear-induced damage or chain-scission of polymer chains. Input and output streams 116 and 117 can be configured in some cases to enhance circulation through the reactor 114. For example, the input stream 116 can be positioned such that the polymerizing mixture is drawn from the bottom of reactor 114 and the output stream 117 can be position to inject the polymerizing mixture near the top inlet of the reactor 114.

Mixing device 106b may be the same as or similar to 106a, or can be modified to have differing internal dimensions, configured to perform at differing flow rates, and/or contain additional inputs for adding/replenishing various reactants for the polymerizing mixture. In some embodiments, additional reactants and additives can be added as stream 118 to the mixing device 106b, which can increase the distribution of reactants throughout the mixture and/or between phases of an emulsion. Mixing device 106b can minimize turbulence and eddies, which can enhance mixing and emulsification with minimal damage to polymer products, enabling the polymerizing mixture to be cycled multiple times.

In some embodiments, the mixing device 106b may perform at least three functions: 1) to provide the motive flow to introduce the input stream 116 into the mixing device 106b, 2) to enhance mixing of the polymerizing mixture in the input stream 116, and 3) to separate and extend the polymer molecules in the input stream 116 to increase reactive site availability and enhance chain extension reactions. The geometry of the fluid contact surfaces in mixing device 106b may be optimized to ensure that the flow of liquid in the input stream 116 smoothly converges to prevent splashing (eddies).

Polymerization in the reactor 114 can be terminated by any suitable technique, including the addition of a terminating agent to the polymerizing mixture by the streams 118 and/or 119. Upon completion of the polymerization reaction, polymerized mixture is transferred by stream 121 to a separation unit 120, which can include one or more separators for separating gaseous, liquid, and/or solid components, such as line dryers, high-pressure separators, low-pressure separators, and the like. Separated components such as monomers, solvents, oligomers, and the like, can be returned to the reactor 114 by way of the stream 123. Following extraction from separation unit 120, polymer product is isolated at 124. In some embodiments, polymerized mixture 122 can be transferred from mixing device 106b directly to separation unit 120. Prior to isolating the polymer product at 124, the polymerization system 100 can also include an optional polymer concentration step in which the polymer product is directed to a mixing device 106c (dashed box) that is configured for vacuum distillation in which excess water and/or solvent is removed as stream 128, while concentrated polymer product is obtained as 124.

While not expressly depicted, the polymerization system 100 may further include various pumps, valves, shut offs, sensors, and other devices to control, among others, the mixing efficiency and effectiveness of the mixing devices 106a,b, the concentration of reactants and fluid levels in the reactor 114, and to control the supply of the mixture 121 to the downstream separation unit 120.

In some embodiments, the polymerization system 100 can be fully or partially automated. In such embodiments, the polymerization system 100 may include a control system 126 used to regulate, monitor, and maintain efficient operation of the polymerization system 100. The control system 126 may be in communication (either wired or wirelessly) with various components of the polymerization system 100. The mixing and discharge pumps, for example, may be communicably coupled to the control system 126, which may monitor and regulate the flow rate of each pump to ensure that the fluid level within the reactor 114 is maintained at a proper level. The control system 126 may also regulate the feed rate of the polymerizable mixture by the stream 112 or reactant addition by streams 118 and 119 to ensure that the concentration of components in the reactor 114 are at the desired levels. For example, if the mixing rate increases or decreases to adjust fluid level within the reactor 114, the feed rate of the polymerizable mixture by the stream 112 may also be adjusted autonomously by the control system 126.

Figure 2:
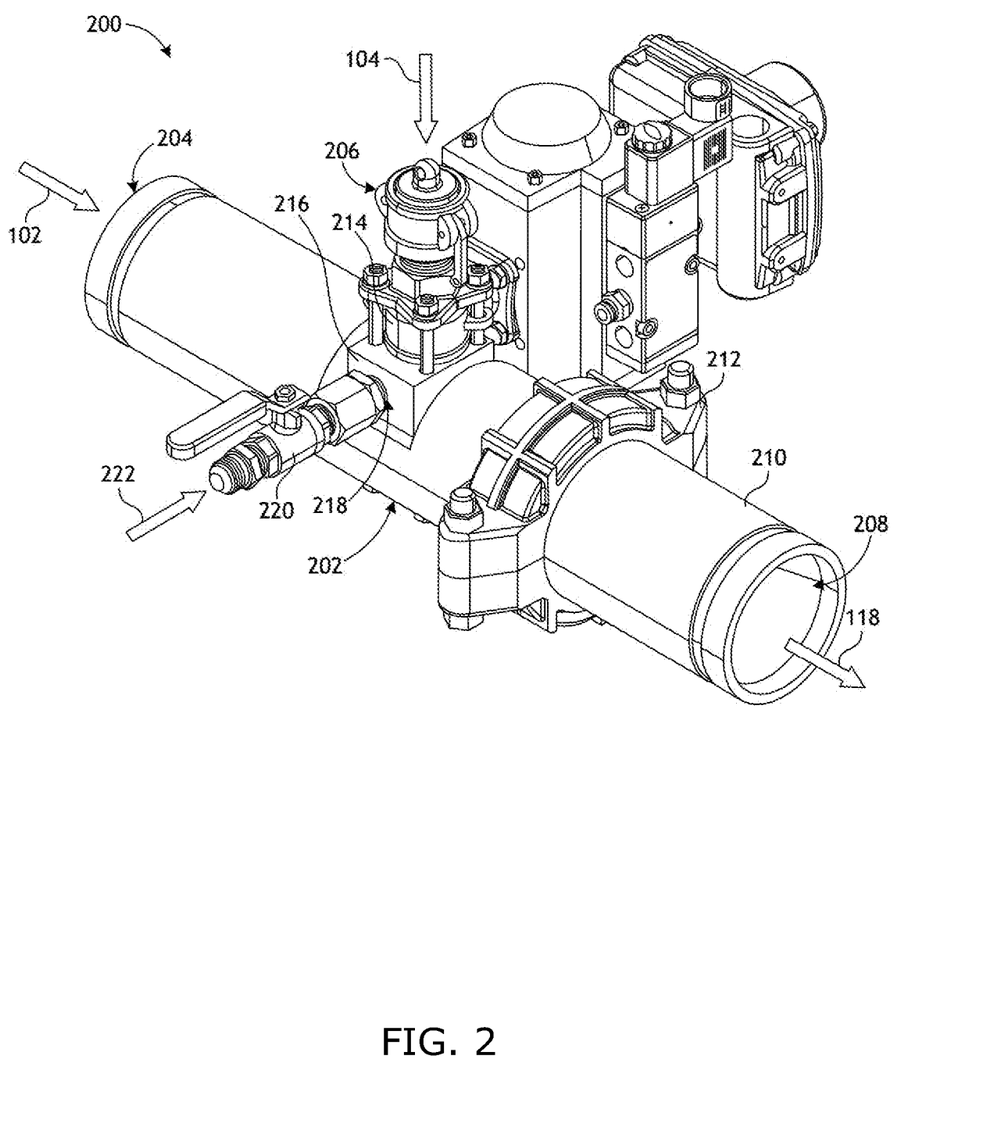
FIG. 2 is an isometric view of an example mixing device, according to one or more embodiments of the present disclosure.

As described above, the mixing devices 106a,b enable various functions at differing stages of polymerization system 100. By way of nonlimiting example, FIG. 2 is an isometric view of an example mixing device 200, which may be the same as or similar to one or both of the mixing devices 106a,b of FIG. 1 and, therefore, may be best understood with respect thereto. As illustrated, the mixing device 200 may include an extender 202 having a fluid inlet 204, a secondary inlet 206, an outlet 208, and a valve 220 (e.g., tertiary inlet/outlet).

Depending on the usage in polymerization system 100, the mixing device 200 can have variations in configuration and function. When configured to remove gasses and/or prepare invert emulsion, as described with respect to mixing device 106a (FIG. 1), an oleaginous fluid 102 may be introduced into the extender 202 via the fluid inlet 204, and the aqueous fluid 104 may be introduced into the extender passage 202 via the secondary inlet 206. In some embodiments, emulsion preparation and degassing can be performed in a configuration in which oleaginous fluid 102 and aqueous fluid 104 are combined prior to introduction into the extender 202 via the fluid inlet 204 and an inert gas is introduced as stream 108 (FIG. 1) through secondary inlet 206, while oxygen and other gases are removed by an applied vacuum as stream 110 (FIG. 1) through valve 220. In yet other embodiments, additional valves (not pictured) configured as gas inlets and outlets can be installed along extender passage 202 and used to handle gas streams 108 and 110, respectively. Following emulsification and degassing, inverse emulsion may exit the extender passage 202 via the outlet 208 to be conveyed into the reactor 114 (FIG. 1), as generally described above.

The geometry of the extender 202 may cause the oleaginous liquid 102 to form a jet that flows through the extender 202 and generates a low-pressure vacuum that draws the aqueous fluid 104 into the mixing device 200 to mix with the oleaginous liquid 102. The formation of the jet also imparts energy to the mixture to help disperse the aqueous fluid 104 and generate the emulsion. The outlet 208 may be formed by a diffuser 210 coupled to the extender 202 at a coupling 212. In other embodiments, however, the diffuser 210 may form an integral part or extension of the extender 202.

The secondary inlet 206 may include a valve 214 that regulates flow of aqueous fluid 104 into the extender 202. The valve 214 may comprise, for example, a ball valve that may be manually operated or operated by automation using the control system 126 (FIG. 1). In the illustrated embodiment, the secondary inlet 206 may further include a spacer 216 interposing the valve 214 and the extender 202.

In some embodiments, valve 220 can be used to supply a flushing fluid 222 to remove residual components of injected streams 102 or 104. The spacer 216 may define a port 218 and the valve 220 may be fluidly coupled to the spacer 216 at the port 218. The valve 220 may be actuated as needed to introduce a flushing fluid 222 into the extender 202 to remove any buildup of may be coated on the inner walls of the spacer 216 and a suction port that feeds the aqueous fluid 104 into the extender 202. Similar to the valve 214, the valve 220 may be manually operated or operated by automation using the control system 126 (FIG. 1).

When it is desired to flush the system, the valve 214 may be closed (either manually or automated), and the valve 220 may be opened (either manually or automated) to allow the flushing fluid 222 to enter the spacer 216 and the extender 202. The flushing fluid 222 may be any fluid that may remove buildup including, but not limited to, water (e.g., fresh or salt), gas (e.g., air, nitrogen, carbon dioxide, etc.), hydrocarbon (e.g., ethanol, methanol, etc.), polymer residue, or any combination thereof. In at least one embodiment, the flushing fluid 222 may comprise a portion of the oleaginous liquid 102 separated from the main portion and piped to the valve 220.

Figure 3:
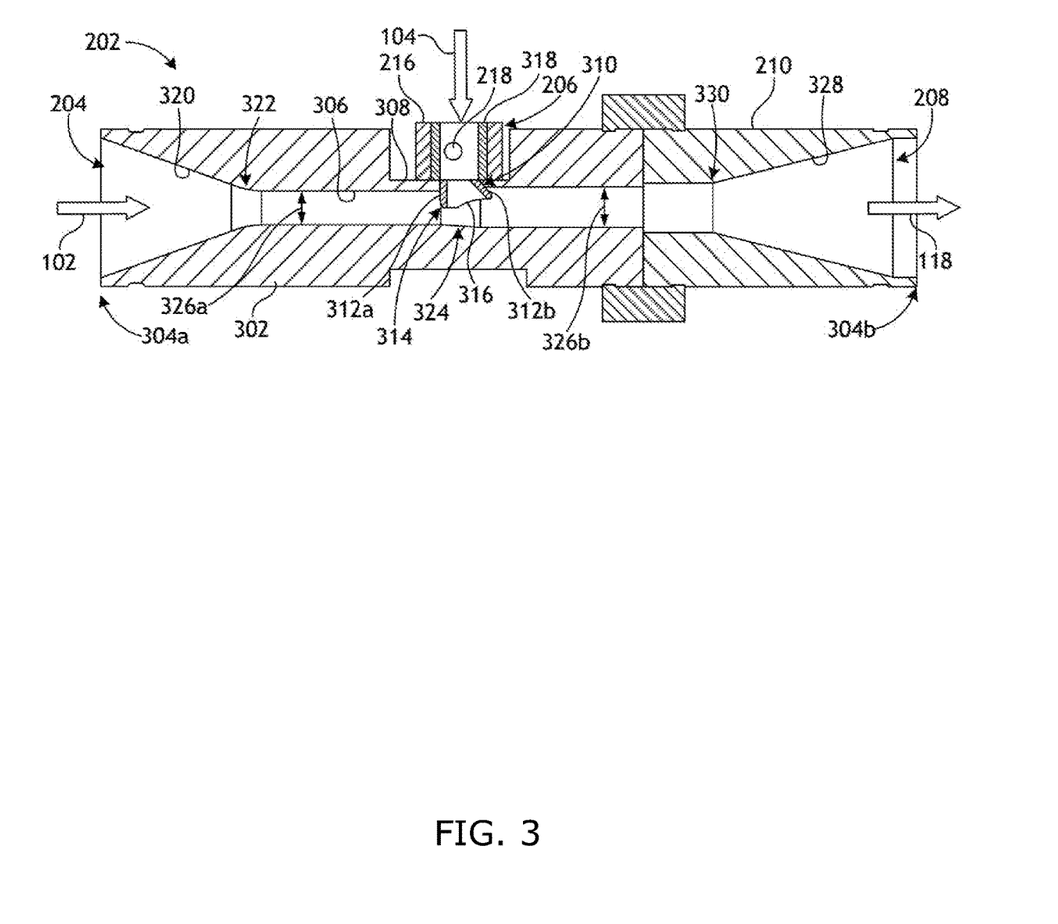
FIG. 3 is a cross-sectional side view of one embodiment of the extender of FIG. 2.

FIG. 3 is a cross-sectional side view of a nonlimiting embodiment of the extender 202. As illustrated, the extender 202 includes an elongate body 302 having a first end 304a and a second end 304b. The fluid inlet 204 is provided at the first end 304a, the outlet 208 is provided at the second end 304b, and a throat 306 extends between the fluid inlet 204 and the outlet 208. In some embodiments, the extender 202 may be made of a metal, such as carbon steel, stainless steel (e.g., polished stainless steel, chrome plated steel, etc.), aluminum, any alloys thereof, or any combination thereof. Alternatively, the extender 202 may be made of a plastic or polymer, such as polytetrafluoroethylene (PTFE or TEFLON®), NYLON®, HYLON®, polyvinyl chloride (PVC), chlorinated polyvinyl chloride (CPVC), or any combination thereof. In one or more embodiments, a hydrophobic coating may be applied to the inner walls of some or all of the extender 202. In yet other embodiments, the inner walls of some or all of the extender 202 may be polished to reduce friction.

Only a portion of the secondary inlet 206 is depicted in FIG. 3. More particularly, the valve 214 (FIG. 2) is omitted, but the spacer 216 is depicted and defines the port 218 through which the flushing fluid 222 (FIG. 2) can be injected into the extender 202. In the illustrated embodiment, a recessed portion or "cutout" 308 is defined in the outer wall of the body 302, and the secondary inlet 206 may be secured to the extender 202 within the cutout 308. Mounting the secondary inlet 206 to the extender 202 within the cutout 308 helps to mitigate the occurrence of the aqueous liquid 104 on the inner walls of the secondary inlet 206.

The secondary inlet 206 may further include a suction port 310 that extends from the spacer 216 and into the throat 306 of the extender 202 at an intermediate point between the first and second ends 304a,b. The suction port 310 may be generally cylindrical and may expand or otherwise flare outward as it extends into the throat 306. In such embodiments, the diameter of the suction port 310 at or near the spacer 216 may be smaller than the diameter of the suction port 310 at its opposing end within the throat 306. This may prove advantageous in providing a larger discharge area for the aqueous fluid 104 to be combined with the oleaginous fluid 102 flowing through the throat 306.

In some embodiments, a leading (upstream) edge 312a of the suction port 310 may extend deeper (further) into the throat 306 as compared to a trailing (downstream) edge 312b of the suction port 310. This may prove advantageous in helping to prevent the incoming aqueous fluid 104 from rebounding off the jet of oleaginous fluid 102 flowing through the throat 306 and splashing back onto portions of the suction port 310. Moreover, in at least one embodiment, the leading edge 312a may define or provide a beveled bottom edge 314 and the suction port 310 may define a chamfered portion 316 that facilitates the transition between the leading and trailing edges 312a,b. The beveled bottom edge 314 and the chamfered portion 316 may be designed to help minimize or prevent splashing of the aqueous liquid 104 as it is introduced into the throat 306.

In some embodiments, the suction port 310 may be made of a metal, such as carbon steel, stainless steel (e.g., polished stainless steel, chrome plated steel, etc.), aluminum, any alloys thereof, or any combination thereof. Alternatively, the suction port 310 may be made of a plastic or a polymer, such as polytetrafluoroethylene (PTFE or TEFLON®), NYLON®, HYLON®, polyvinyl chloride (PVC), chlorinated polyvinyl chloride (CPVC), or any combination thereof. In yet other embodiments, or in addition thereto, all or a portion of the spacer 216 and the suction port 310 may be lined with a lubricious material 318, such as CPVC. The lubricious material 318 may help repel the polymerizable additive 104 and help facilitate a cleaner flushing when the port 218 is used to introduce the flushing fluid 222 (FIG. 2) to remove any buildup that may be coated on the inner walls of the spacer 216 and the suction port 310. In at least one embodiment, the lubricious material 318 may further line the inner walls of the valve 214 (FIG. 2).

In embodiments that include flushing capabilities, the extender 202 may be cleaned and flushed at periodic intervals, such as at every 20 minutes of operation, or every 30 minutes, every hour, etc. In such embodiments, the control system 126 (FIG. 1) may autonomously control operation of the flushing operations. The control system 126 may also use various flow and pressure measurements to ensure that the extender 202 is maintaining suitable suction conditions. In the event any parameters deviate from normal values, the control system 126 (FIG. 1) may cause the valve 214 (FIG. 2) to close to eliminate a backflush condition through the suction line, and initiate a flush of the extender 202.

The extender 202 may also be flushed before and/or after the mixing process is completed. Flushing the extender 202 prior to starting a mixing process may prove advantageous since if there is any build up on the inner walls of the extender 202 (e.g., the valve 214 of FIG. 2, the spacer 216, and the suction port 310), it will have already absorbed water and softened, thus making it much easier to.

The throat 306 may form at least a portion of the elongated passageway described herein above that helps elongate and unfold the polymer structure of forming polymers with minimum damage, such as those in streams 116, 117, and 120 of FIG. 1. Accordingly, the elongated passageway and the throat 306 may comprise the same structure and may be referred to herein interchangeably. More specifically, the geometry of the extender 202 may help ensure that the oleaginous liquid 102 flowing through the throat 306 smoothly converges and mitigates splashing where the aqueous fluid 104 is introduced into the stream at the suction port 310. More particularly, the fluid inlet 204 may define or otherwise provide a converging portion 320 that tapers inward to form a nozzle. The oleaginous fluid 102 forms a jet as it is forced to transition from the converging portion 310 to the throat 306.

In some embodiments, the converging portion 320 may transition to the throat 306 at an arcuate transition 322 that exhibits a radius. As opposed to a sharp corner transition, the arcuate transition 322 provides smooth and curved transition walls. The radius and arcuate length of the arcuate transition 322 may be determined based on the remaining geometry of the extender 202. In at least one embodiment, the arcuate length of the arcuate transition 322 may be about 2.0 inches, but could alternatively be less than or greater than 2.0 inches, without departing from the scope of the disclosure. The arcuate transition 322 may help the flow of the oleaginous fluid 102 to become extensional and smooth, with little or no turbulence, as it forms the jet flowing into the throat 306, and smoother flow of the oleaginous fluid 102 may help prevent splashing as the aqueous fluid 104 enters the throat 306 at the suction port 310.

During example operation, in some embodiments, opening of the valve 214 (FIG. 2) to introduce the aqueous fluid 104 may be delayed for a short period (e.g., 5 or more seconds) to allow the flow of the oleaginous fluid 102 through the throat 306 to become extensional. Once proper conditions are attained, the valve 214 can be opened to initiate feeding the aqueous fluid 104 and forming the emulsion in stream 112.

In some embodiments, the diameter of the throat 306 may increase at or near the suction port 310 and otherwise where the oleaginous fluid 104 is introduced into the throat 306. More specifically, the throat 306 may define an expansion transition 324 that increases the diameter of the throat 306 in the downstream direction. Consequently, the diameter 326a of the throat 306 upstream from the expansion transition 324 may be smaller than the diameter 326b of the throat 306 downstream from the expansion transition 324. Increasing the diameter of the throat 306 at or near the suction port 310 may prove advantageous in removing the jet of oleaginous fluid 102 from the walls of the throat 306 at that point so that it does not impinge directly on abrupt structural edges of the suction port 310. The expansion transition 324 also provides additional room for the aqueous fluid 104 to be introduced into the throat 306.

The diffuser 210 extends the length of the throat 306 and provides or otherwise defines a diverging portion 328 that tapers outward in the downstream direction. The throat 306 may transition to the diverging portion 328 at a transition 330. In some embodiments, as illustrated, the transition 330 may provide a sharp corner transition. In other embodiments, however, the transition 330 may provide a smooth, curved transition across an arcuate portion having a radius, without departing from the scope of the disclosure.

The mixing device 200 may also be configured to place the polymerizing mixture within the reactor 114 (FIG. 1) into extensional flow and enhance mixing as described with respect to mixing device 106b (FIG. 1). As indicated above, mixing device 106b can be structurally similar to or the same as mixing device 106a, described above with respect to FIG. 2 and FIG. 3, and is best understood with respect thereto. In one or more intervals, the stream 116 (FIG. 1) containing the polymerizing mixture can be directed from the reactor 114 and introduced into the extender 202 via the fluid inlet 204. Secondary inlet 206 may be used to introduce the additive stream 118 (FIG. 1) to extender passage 202, which may be used to deliver, e.g., reactants or polymerization modifiers. In some embodiments, mixing of the polymerizing mixture can be enhanced by diverting a portion of stream 116 to secondary inlet 204 or valve 222, where the stream is then recombined with the remainder of stream 116 entering fluid inlet 204. The mixture then continues through extender 202. Following treatment with extender 106b, the stream 117 may exit the extender passage 202 via the outlet 208 to be conveyed back to the reactor 114 or separation unit 120 (FIG. 1), as generally described above.

The streams 116 and 117 can comprise a mixture of polymer chains. The extensional flow generated by mixing device 106b (FIG. 1) containing the extender 202 tends to stretch the polymer chains without scission or chain transfer, while enhancing chain extension reactions by increasing reactive site accessibility and reactant mixing.

In some embodiments, the mixing device 200 may also be configured for vacuum distillation as described with respect to mixing device 106c (FIG. 1) to remove water and/or other solvents and to increase polymer content of the polymer product 124 (FIG. 1). Mixing device 106c can be structurally similar to or the same as mixing device 106a, described above with respect to FIG. 2 and FIG. 3, and is best understood with respect thereto. For example, the product stream obtained from separation unit 120 can be introduced into the extender 202 via the fluid inlet 204. A suitable outlet, such as valve 220, can be used to withdraw volatile components such as water or solvent from the product stream which can be removed as stream 128 (FIG. 1), while the concentrated polymer product is obtained as 124.

Monomers

Polymerization methods in accordance with the present disclosure can be adapted to the synthesis of any polymer or copolymer, including ionic and nonionic polymers, and random and block copolymers. Suitable monomers can include any hydrophilic monomer or combination of monomers having vinyl or unsaturated substituents (anionic, cation, amphoteric, or nonionic), and heterocyclic monomers. Example monomers include acrylic acid and methacrylic acid derivatives, acrylamide, 2-acrylamido-2-methylporpane sulfonic acid (AMPS), diallyldimethylammonium chloride (DADMAC), alkyl vinyl ethers, cyclic lactams, cyclic lactones, salt derivatives thereof, and mixtures thereof. Depending on solubility, monomers and comonomers may be dissolved in the aqueous or oleaginous phase. In some embodiments, monomers or comonomers may localize at the interphase boundary and function as emulsifiers.

Polymers produced by methods disclosed herein may have a weight average molecular weight of 10,000 g/mol to 50,000,000 g/mol or greater. In some embodiments, polymers may have a weight average molecular weight in a range of 500,000 g/mol to 50,000,000 g/mol, 1,000,000 g/mol to 50,000,000 g/mol, 5,000,000 g/mol to 50,000,000 g/mol, or 10,000,000 g/mol to 50,000,000 g/mol. Polymers produced may have a branching index in a range of 0.95 to 1.0 or greater.

Initiators

Initiators for this methodology can be free radical, anionic, or cationic. Radical initiators can be initiated by thermal decomposition, photolysis, and redox reactions including but not limited to dicumyl peroxide, azobisisobutyronitrile (AIBN), peroxide with ferrous iron (Fe(II)), and potassium persulfate. Anionic initiators can be initiated by amine, phosphine, and alkyl lithium nucleophiles like tris (hydroylmethyl) phosphine or n-butyl lithium. Nucleophilic strength will depend on the stability of the anion created at the polymer active center. Cationic initiators are non-nucleophilic cations e.g. triphenylmethane cation and tropylium cation.

Initiators can include one or more organic or inorganic compounds that generate free radicals under the conditions employed. In some embodiments, the initiator is a per-oxygen type compound, such as an organic peroxide. Examples of suitable initiators are per-oxygen compounds such as hydrogen peroxide, dialkyl dioxides, such as diethyl peroxide, and ditertiary butyl peroxide: buyryl peroxide and lauroyl peroxide; benzoyl peroxide; alkyl-hydroperoxides, diperoxy dicarbonate esters, tertiary alkyl percarboxylates, such as tertiary butyl perbenzoate and potassium persulfate; azo-bis (isobutyronitrile); azines, such as benzaiazine; and oximes, such as acetone oxide. Particularly suitable are mixtures of the per-oxygen compounds, for example peroxides such as lauroyl peroxide and ditertiary-butyl peroxide in various proportions.

Base Fluids

Oleaginous fluids in accordance with the present disclosure include paraffinic hydrocarbons with or without solvents like mineral oil with toluene, diesel, mineral oil, vegetable oil, synthetic oil, silicone oil, or mixtures of these or similar materials. Aqueous fluids (equivalently non-oleaginous fluids) can include aqueous fluids including fresh water, seawater, brine, and other similar fluids.

Emulsifiers

Polymerization methods disclosed herein can include emulsion polymerizations that include one or more emulsifiers. Emulsifiers can include any emulsifier or blend capable of enhancing the kinetic stability of the selected emulsion system (e.g., invert emulsions, direction emulsions, etc.), including one or more emulsifiers such as polyethoxylated phenols, polyethoxylated sorbitans, polyethoxylated alcohols, carboxylic acid esters, and the like.

In some embodiments, emulsions can include a single emulsifier or a mixture of emulsifiers with varied hydrophilic-lipophilic balance (HLB). The emulsifier may contain vinyl olefin functional groups capable of inclusion in the polymer chain.

To facilitate a better understanding of the embodiments of the present invention, the following examples of preferred or representative embodiments are given. In no way should the following examples be read to limit, or to define, the scope of the invention.

Example 1: Representative Invert Emulsion Polymerization

In the following example, an invert emulsion polymerization system as disclosed herein is used to perform an inverse emulsion synthesis of polyacrylamide in continuous and batch processes. The methodology has the overall steps of: A. preparation of aqueous and oil phases; B. blending of aqueous phase and oil phases; C. initiation of polymerization; D. termination and polymer isolation. Each of the steps are discussed in detail below.

A. Preparation of Aqueous and Oil Phases

The aqueous phase of the invert emulsion is prepared by dissolving acrylamide monomer in an aqueous fluid with or without a comonomer. The aqueous phase may also contain other additives such as inorganic salts, acid, base, pH buffer, initiator precursor, and cooling agents such as ice and dry ice. The oil phase contains a paraffinic hydrocarbon(s), an emulsifier made up of one or more surfactants, and an optional initiator precursor.

B. Blending of the Aqueous and Oil Phases

The aqueous and oleaginous phases are combined using a mixing device incorporating an extender, which results in a homogenized inverse emulsion (w/o) or inverse microemulsion (w/o). During emulsification, the mixing device simultaneously saturates the liquids with nitrogen gas by addition of pure nitrogen gas as part of the degassing process. The emulsion blending/degassing step can be a batch process where the liquids are blended and degassed in a single tank under slight vacuum, or a continuous process where the emulsion flows into a resonance tank under slight vacuum.

C. Initiation of Polymerization

After emulsification and degassing, the emulsion is initiated using initiators like sodium bisulfite with sodium bromate, or azobisisobutyronitrile (AIBN) present in a constituent phase prior to emulsion or added to the emulsion prior to propagation. Propagation can then occur through a recirculation of the material in a batch reactor or in a continuous process using an inline mixed tube reactor of sufficient length to for the desired degree of propagation. To inhibit chain transfer reactions and increase polymer linearity, the polymerizing mixture is transferred to a mixing device that includes an extender from a batch or linear reactor. As the polymerizing mixture passes through the extender, the polymer chains stretch, which inhibits intramolecular chain transfer and other branching reactions.

During propagation, the system can be cooled by cooling tower water, chilled water, or other heat exchanger to maintain an isothermal environment. In some embodiments, polymerization reactions can be adiabatic and cooled after propagation by cooling tower water, chilled water, flash evaporator cooling/concentration, and the like.

D. Termination and Polymer Isolation

After cooling, termination by an appropriate material e.g. radical scavenger, radical inhibitor, or complete consumption of monomer. The polymer can then be isolate by precipitation or phase inversion.

EMBODIMENTS LISTING

The present disclosure provides, among others, the following examples, each of which may be considered as optionally including any alternate example.

Clause 1. A method includes combining an aqueous fluid and an oleaginous fluid to prepare an invert emulsion comprising a polymerizable composition; degassing the invert emulsion under an extensional flow regime through an elongated passageway of an extender and thereby removing oxygen to produce a degassed invert emulsion, wherein a flow rate of the invert emulsion and a diameter of the elongated passageway are sufficient to achieve a Reynolds number of 20,000 or greater.

Clause 2. The method of clause 1, wherein preparing the invert emulsion and degassing the invert emulsion occur simultaneously.

Clause 3. The method of clause 1, wherein degassing is performed under inert gas.

Clause 4. The method of clause 1, wherein the diameter of the elongated passageway is 45 mm or less.

Clause 5. The method of clause 1, wherein the degassed invert emulsion comprises an oxygen concentration of 1 ppm or less.

Clause 6. The method of clause 1, wherein the invert emulsion comprises one or more emulsifiers selected from a group of polyethoxylated phenols, polyethoxylated sorbitans, polyethoxylated alcohols, and carboxylic acid esters.

Clause 7. The method of clause 1, wherein the extender is a first extender, the method further including transferring the degassed invert emulsion to a reactor that is fluidly connected with a second extender; initiating polymerization of the polymerizable composition in the degassed invert emulsion; transferring at least a portion of the degassed invert emulsion to the second extender at one or more time intervals and returning the portion of the degassed invert emulsion to the reactor, wherein a flow rate of the invert emulsion and a diameter of the elongated passageway are sufficient to achieve a Reynolds number of 20,000 or greater; and isolating a polymer product from the degassed invert emulsion.

Clause 8. The method of clause 7, further including terminating the polymerization with a polymerization terminator fed into the second extender.

Clause 9. The method of clause 7, wherein the second extender comprises an elongated passageway having a diameter of 45 mm or less.

Clause 10. The method of clause 7, wherein the polymer product has a weight average molecular weight of 10,000 g/mol to 50,000,000 g/mol.

Clause 11. The method of clause 7, wherein the polymer product has a branching index in a range of 0.95 to 1.0.

Clause 12. The method of clause 7, wherein the invert emulsion has a particle size according to ASTM G205-16 in a range of 50 Å to 100 Å.

Clause 13. The method of clause 7, wherein the polymerizable composition comprises one or more monomers selected from a group consisting of acrylamide, acrylic acid, 2-acrylamido-2-methylporpane sulfonic acid, diallyldimethylammonium chloride, cyclic lactams, and cyclic lactones.

Clause 14. The method of clause 7, further including: transferring the isolated polymer product to a third extender configured for vacuum distillation; removing a stream comprising at least one of water or solvent from the isolated polymer product to create a concentrated polymer stream.

Clause 15. A method, including charging a reactor with an invert emulsion comprising a polymerizable composition, the reactor fluidly connected with an extender; initiating polymerization of the polymerizable mixture in the reactor; transferring at least a portion of the invert emulsion to an extender at one or more time intervals and returning the portion of the degassed invert emulsion to the reactor; and isolating a polymer product from the degassed invert emulsion.

Clause 16. The method of clause 15, further comprising terminating the polymerization with a polymerization terminator fed into the extender.

Clause 17. The method of clause 15, wherein the reactor is a continuous feed reactor.

Clause 18. The method of clause 15, where the reactor is an inline mixed tube reactor.

Clause 19. A method, including combining an aqueous fluid with a nonaqueous fluid to form an invert emulsion comprising a polymerizable mixture under an extensional flow regime through an elongated passageway of a first extender, wherein a flow rate of the invert emulsion and a diameter of the elongated passageway are sufficient to achieve a Reynolds number of 20,000 or greater; degassing the invert emulsion under an extensional flow regime through an elongated passageway of a first extender in the presence of an inert gas to produce a degassed invert emulsion; transferring the degassed invert emulsion to a reactor that is fluidly connected with a second extender; initiating polymerization of the polymerizable mixture in the degassed invert emulsion within the reactor; transferring at least a portion of the degassed invert emulsion to the second extender at one or more time intervals and returning the portion of the degassed invert emulsion to the reactor; and isolating a polymer product from the degassed invert emulsion.

Clause 20. A polymer composition comprising a polymer prepared by the process of clause 19.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure.

The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of"

the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method, comprising:
combining an aqueous fluid and an oleaginous fluid to prepare an invert emulsion comprising a polymerizable composition; and
degassing the invert emulsion under an extensional flow regime through an elongated passageway of an extender and thereby removing oxygen to produce a degassed invert emulsion,
wherein a flow rate of the invert emulsion and a diameter of the elongated passageway are sufficient to achieve a Reynolds number of 20,000 or greater.

2. The method of claim 1, wherein preparing the invert emulsion and degassing the invert emulsion occur simultaneously.

3. The method of claim 1, wherein degassing is performed under inert gas.

4. The method of claim 1, wherein the diameter of the elongated passageway is 45 mm or less.

5. The method of claim 1, wherein the degassed invert emulsion comprises an oxygen concentration of 1 ppm or less.

6. The method of claim 1, wherein the invert emulsion comprises one or more emulsifiers selected from a group consisting of polyethoxylated phenols, polyethoxylated sorbitans, polyethoxylated alcohols, and carboxylic acid esters.

7. The method of claim 1, wherein the extender is a first extender, the method further comprising:
transferring the degassed invert emulsion to a reactor that is fluidly connected with a second extender;
initiating polymerization of the polymerizable composition in the degassed invert emulsion;
transferring at least a portion of the degassed invert emulsion to the second extender at one or more time intervals and returning the portion of the degassed invert emulsion to the reactor, wherein a flow rate of the invert emulsion and a diameter of the elongated passageway are sufficient to achieve a Reynolds number of 20,000 or greater; and
isolating a polymer product from the degassed invert emulsion.

8. The method of claim 7, further comprising terminating the polymerization with a polymerization terminator fed into the second extender.

9. The method of claim 7, wherein the second extender comprises an elongated passageway having a diameter of 45 mm or less.

10. The method of claim 7, wherein the polymer product has a weight average molecular weight of 10,000 g/mol to 50,000,000 g/mol.

11. The method of claim 7, wherein the polymer product has a branching index in a range of 0.95 to 1.0.

12. The method of claim 7, wherein the invert emulsion has a particle size according to ASTM G205-16 in a range of 50 Å to 100 Å.

13. The method of claim 7, wherein the polymerizable composition comprises one or more monomers selected from a group consisting of acrylamide, acrylic acid, 2-acrylamido-2-methylporpane sulfonic acid, diallyldimethylammonium chloride, cyclic lactams, and cyclic lactones.

14. The method of claim 7, further comprising:
transferring the isolated polymer product to a third extender configured for vacuum distillation;
removing a stream comprising at least one of water or solvent from the isolated polymer product to create a concentrated polymer stream.

15. A method, comprising:
charging a reactor with an invert emulsion comprising a polymerizable composition, the reactor fluidly connected with an extender;
initiating polymerization of the polymerizable mixture in the reactor;
transferring at least a portion of the invert emulsion under an extensional flow regime through an elongated passageway of an extender at one or more time intervals and returning the portion of the invert emulsion to the reactor; and
isolating a polymer product from the invert emulsion.

16. The method of claim 15, further comprising terminating the polymerization with a polymerization terminator fed into the extender.

17. The method of claim 15, wherein the reactor is a continuous feed reactor.

18. The method of claim 15, where the reactor is an inline mixed tube reactor.

19. A method, comprising:
combining an aqueous fluid with a nonaqueous fluid to form an invert emulsion comprising a polymerizable mixture under an extensional flow regime through an elongated passageway of a first extender, wherein a flow rate of the invert emulsion and a diameter of the elongated passageway are sufficient to achieve a Reynolds number of 20,000 or greater;
degassing the invert emulsion under the extensional flow regime through the elongated passageway of the first extender in the presence of an inert gas to produce a degassed invert emulsion;
transferring the degassed invert emulsion to a reactor that is fluidly connected with a second extender;
initiating polymerization of the polymerizable mixture in the degassed invert emulsion within the reactor;
transferring at least a portion of the degassed invert emulsion to the second extender at one or more time intervals and returning the portion of the degassed invert emulsion to the reactor; and isolating a polymer product from the degassed invert emulsion.

20. A polymer composition comprising a polymer prepared by the process of claim 19.

* * * * *